United States Patent
Kim et al.

(10) Patent No.: US 8,860,909 B2
(45) Date of Patent: Oct. 14, 2014

(54) TRANSPARENT DISPLAY DEVICE

(75) Inventors: Eung-Do Kim, Gyeonggi-Do (KR); Se-Hong Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 329 days.

(21) Appl. No.: 12/966,038

(22) Filed: Dec. 13, 2010

(65) Prior Publication Data

US 2011/0141394 A1    Jun. 16, 2011

(30) Foreign Application Priority Data

Dec. 15, 2009  (KR) .................. 10-2009-0125068

(51) Int. Cl.
*G02F 1/1335* (2006.01)
*F21V 8/00* (2006.01)

(52) U.S. Cl.
CPC ............ *G02B 6/0035* (2013.01); *G02B 6/0065* (2013.01)
USPC .............................................. 349/65; 349/62

(58) Field of Classification Search
USPC ................. 349/61–68; 362/608, 629
See application file for complete search history.

(56) References Cited

U.S. PATENT DOCUMENTS

| | | | | |
|---|---|---|---|---|
| 6,163,351 A | * | 12/2000 | Nakayama | 349/61 |
| 2004/0119910 A1 | * | 6/2004 | Maeda et al. | 349/65 |
| 2007/0274701 A1 | | 11/2007 | Chiba et al. | |
| 2008/0267572 A1 | * | 10/2008 | Sampsell et al. | 385/129 |
| 2010/0302799 A1 | * | 12/2010 | Rosberg et al. | 362/602 |
| 2012/0002136 A1 | | 1/2012 | Nagata et al. | |

FOREIGN PATENT DOCUMENTS

| | | |
|---|---|---|
| CN | 101458900 A | 6/2009 |
| CN | 101506573 A | 8/2009 |
| KR | 10-2007-0071379 A | 4/2007 |

OTHER PUBLICATIONS

Chinese Office Action in corresponding Chinese Patent Application No. 201010584159.4 issued Dec. 26, 2011 with English translation.
Office Action dated Feb. 25, 2013 from the Korean Intellectual Property Office in counterpart Korean application No. 10-2009-0125068.

* cited by examiner

*Primary Examiner* — Bumsuk Won
*Assistant Examiner* — Charles Chang
(74) *Attorney, Agent, or Firm* — Morgan, Lewis & Bockius LLP (57) ABSTRACT

Disclosed is a transparent display device in which the total refection efficiency of a light guide plate supplying light to a liquid crystal display panel is enhanced thereby enhancing luminance in the image mode, and the transparent display device may include a liquid crystal display panel; a light source disposed at one side of a lower portion of the liquid crystal display panel to emit light; a first polarizing plate for polarizing the light emitted from the light source; a light guide plate disposed at a lower portion of the liquid crystal display panel to totally reflect the light polarized to an axis by the first polarizing plate to a lateral surface thereof and supply to the liquid crystal display panel, and transmit natural light entered from a lower direction therethrough; a plurality of air layers formed inside the light guide plate to totally reflect incident light; and a second polarizing plate disposed at an upper portion of the liquid crystal display panel to control the amount of polarized light transmitting the liquid crystal display panel.

11 Claims, 5 Drawing Sheets

TRANSPARENT DISPLAY DEVICE

CROSS-REFERENCE TO RELATED APPLICATIONS

Pursuant to 35 U.S.C. §119(a), this application claims the benefit of earlier filing date and right of priority to Korean Application No. 10-2009-0125068 filed on Dec. 15, 2009, the contents of which is incorporated by reference herein in its entirety.

BACKGROUND OF THE INVENTION

1. Field of the Invention

The present invention relates to a transparent display device, and more particularly, to a transparent display device in which the total light reflection efficiency of a light guide plate is enhanced to increase the luminance of light supplied to an liquid crystal display panelliquid crystal display panel, thereby enhancing image quality.

2. Description of the Related Art

In recent years, with rising interests in information displays and increasing demands to use portable information media, researches and commercialization of light-weight and thin-profile flat panel displays (FPDs) for substituting traditional displays such as cathode ray tubes (CRTs) have been actively carried out. In particular, among such FPDs, a liquid crystal display (LCD), which is a device displaying images using an optical anisotropy of liquid crystal molecules, has been actively applied to a notebook, a desktop monitor, or the like, because it is excellent in the resolution, color representation, image quality, and the like.

On the other hand, studies on a transparent display device for allowing rear objects thereof to be seen as well as capable of implementing images thereon have been actively carried out. Such a transparent display device may be applicable to vehicle front glasses or house glasses to provide the user's desired information. Therefore, the applicability of such transparent display devices may be expected to be drastically increased.

In general, it may be used an organic light-emitting display device and the like using spontaneous light for the transparent display device.

However, in case of the organic light-emitting display device, a display device thereof can be made only to be transparent, and thus it may be impossible to turn on or off the transparency to make it transparent or implement an image thereon. Also, there are various problems such as low yield, difficulty in making a large-sized display, low reliability, and the like.

As a result, it may be required to develop a liquid crystal display device capable of implementing high yield, large-sized displays, high reliability, as well as capable of implementing wide viewing angle, high luminance, high contrast ratio and full color as a transparent display device, but the liquid crystal display device cannot be used as a transparent display device. However, the liquid crystal display cannot spontaneously emit light but implement an image by using light of the backlight because a non-transparent backlight unit should be provided at a rear surface of the liquid crystal display panel and also polarizing plates should be provided at both front and rear surfaces of the liquid crystal display panel, respectively, to control the transmission of light. In particular, the polarizing plates provided at both front and rear surfaces of the liquid crystal display panel, respectively, allows light to be transmitted therethrough when liquid crystals are driven in the liquid crystal display panel, but light is in a non-transparent state when liquid crystals are not driven, and thus it is impossible to implement a transparent display.

SUMMARY OF THE INVENTION

The present invention is contrived to solve the aforementioned problem and an object of the invention is to provide a transparent display allowing a user to view an object at a rear surface of the display device.

Another object of the present invention is to provide a transparent display device in which the total reflection efficiency of a light guide plate supplying light to a liquid crystal display panel is enhanced, thereby enhancing luminance in the image mode.

In order to accomplish the foregoing object, a transparent display device according to the present invention may include a liquid crystal display panel; a light source disposed at one side of a lower portion of the liquid crystal display panel to emit light; a first polarizing plate for polarizing the light emitted from the light source; a light guide plate disposed at a lower portion of the liquid crystal display panel to reflect totally the light polarized in an axis-direction by the first polarizing plate to a lateral surface of the light guide plate and supply to the liquid crystal display panel, and transmit natural light entered from a lower direction therethrough; a plurality of air layers formed inside the light guide plate to reflect totally the incident light; and a second polarizing plate at an upper portion of the liquid crystal display panel to control the amount of polarized light transmitting the liquid crystal display panel.

According to the present invention, an air layer for totally reflecting light in a light guide plate is formed to enhance the luminance of light supplied to a liquid crystal display panel. As a result, it may be possible to enhance image quality in the image mode of a transparent display device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the present invention will be described in detail with reference to the accompanying drawings.

According to the present invention, there is provided a transparent display device. In other words, according to the present invention, there is provided a display device allowing the user to view an object at a rear surface of the display device. At this time, an object at a rear surface of the display device may be not only displayed by applying a signal, but also the user's desired image may be displayed on the transparent display device.

Moreover, according to the present invention, there is provided a transparent display device capable of enhancing luminance in an image mode in which an image is implemented on the display device. For this purpose, according to the present invention, a total reflection member capable of enhancing the total reflection characteristic of light may be formed inside a light guide plate to enhance the luminance of light supplied from the light guide plate to an liquid crystal display panel, thereby enhancing image quality of the liquid crystal display panel.

Figure 1:
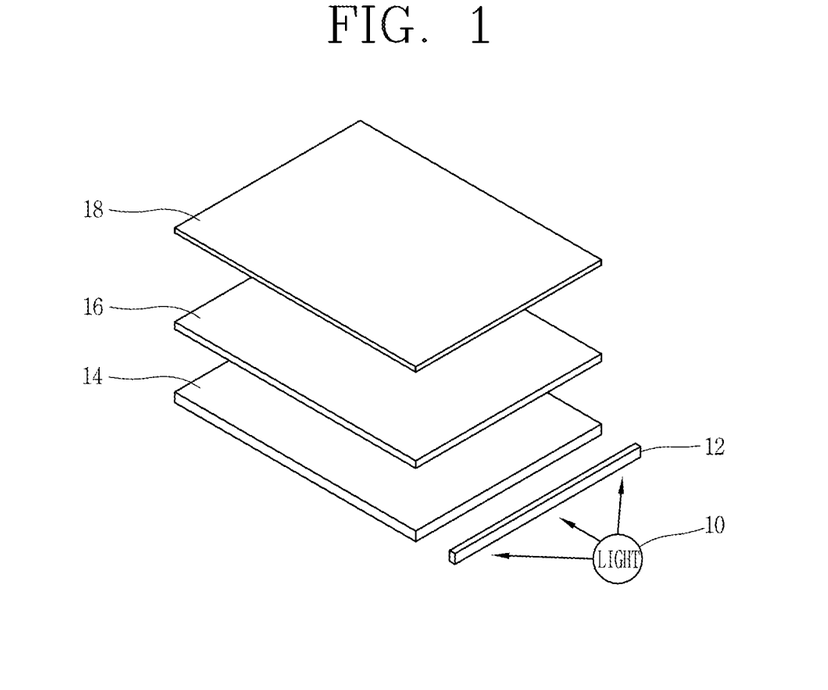
FIG. 1 is a view illustrating the structure of a transparent display device according to a first embodiment of the present invention.

FIG. 1 is a view illustrating the structure of a transparent display device 1 according to a first embodiment of the present invention.

As illustrated in FIG. 1, a transparent liquid crystal display device 1 according to a first embodiment of the present invention may include a liquid crystal display panel 16, a light guide plate 14 disposed at a lower portion of the liquid crystal display panel 16 to guide light to the liquid crystal display panel 16, a light source 10 disposed at a lateral surface of the light guide plate 14 to emit light to the light guide plate 14, a first polarizing plate 12 disposed between the light source 10 and a lateral surface of the light guide plate 14 to polarize the light emitted from the light source to enter into the light guide plate 14, and a second polarizing plate 18 disposed at an upper portion of the liquid crystal display panel 16 to polarize light transmitting through the liquid crystal display panel 16.

Though not shown in the drawing, the liquid crystal display panel 16 is comprised of a thin-film transistor array substrate and a color filter substrate, and a liquid crystal layer therebetween, thereby implementing an image when a signal is applied from the outside. The thin-film transistor array substrate is formed with a plurality of gate lines and data lines vertically and horizontally arranged to define a plurality of pixel regions, and each pixel region is formed with a thin-film transistor which is a switching device, and formed with a pixel electrode formed on the pixel region. In addition, the thin-film transistor may include a gate electrode connected to the gate line, a semiconductor layer formed by depositing amorphous silicon or the like on the gate electrode, and a source electrode and a drain electrode formed on the semiconductor layer and connected to the data line and pixel electrode.

The color filter substrate may include a color filter (C) configured with a plurality of sub-color filters for implementing red (R), green (G), and blue (B) colors, and a black matrix for dividing between the sub-color filters and blocking light passing through the liquid crystal layer.

The thin-film transistor array substrate and color filter substrate configured as described above are adhered by facing each other by a sealant (not shown) formed at an outside of the image display region to constitute a liquid crystal display panel, and the adhesion between the thin-film transistor array substrate and color filter substrate is achieved by an alignment key formed on the thin-film transistor array substrate and color filter substrate.

The light source 10 is disposed in a lateral direction of the light guide plate 14. For the light source 10, it may be used a fluorescent lamp such as a cold cathode fluorescence lamp (CCFL) or external electrode fluorescent lamp (EEFL), or a plurality of light emitting devices (LEDs). In case of using LEDs, it may be used an LED that emits monochromatic light such as red, green, blue, and the like or a white LED that emits white light.

The light emitted from the light source 10 may include a first polarized light (vertical polarized light) and a second polarized light (horizontal polarized light) as visible light. The first polarizing plate 12 may be adhered to a lateral portion of the light guide plate 14. The first polarizing plate 12 is allowed to transmit only a first polarized light from the light including the first polarized light and the second polarized light.

If the light emitted from the light source 10 is entered into the first polarizing plate 12, then a second polarized light component of the light is absorbed by the first polarizing plate 12 to transmit only a first polarized light through the first polarizing plate 12. The light guide plate 14 allows the first polarized light that has passed through the first polarizing plate 12 to be entered into the liquid crystal display panel 16 at an upper portion thereof.

The light guide plate 14 is composed of a transparent material having a high optical transmissivity such acryl, epoxy, polymethyl methacrylate, and the like to guide incident light to the liquid crystal display panel 16. At this time, a pattern 15 is formed at a lower portion of the light guide plate 14.

The light guide plate 14 transmits natural light entered from the rear surface therethrough as it is to supply to the liquid crystal display panel 16, and totally reflects polarized light entered from the lateral surface to supply to the liquid crystal display panel 16.

Figure 2:
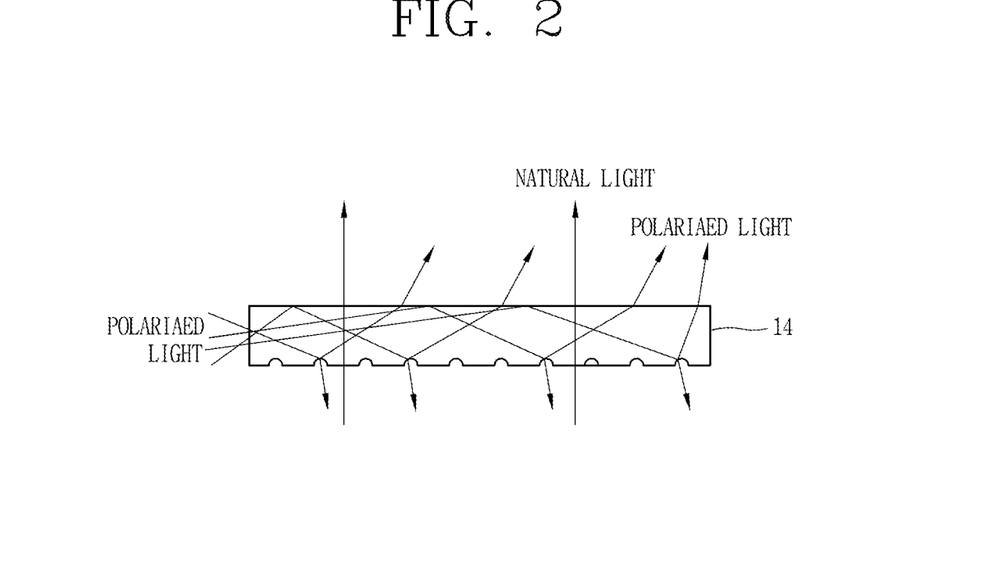
FIG. 2 is a view illustrating the total reflection of light in a light guide plate of the transparent display device according to a first embodiment of the present invention.

Typically, the total reflection of light entered to a lateral surface of the light guide plate 14 is generated by a difference between the refractive index of the light guide plate 14 and the refractive index of air. In other words, in case where light is inputted from a lateral surface of the light guide plate 14 and entered to an interface between the light guide plate 14 and the air at a specific angle due to a difference between the refractive index of the light guide plate 14 (about 1.49 in case of polymethyl methacrylate which is typically used) and the refractive index of air (i.e., 1), the light polarized at the interface is totally reflected and supplied to the liquid crystal display panel 16.

The total reflection of light is determined by Snell's law. Snell's law is illustrated as n1 sin θ1=n2 sin θ2, wherein n1 and n2 are the refractive indices of the air and light guide plate, respectively, and θ1 and θ2 indicate incident angle and the exit angle of light at the interface, respectively.

Figure 3:
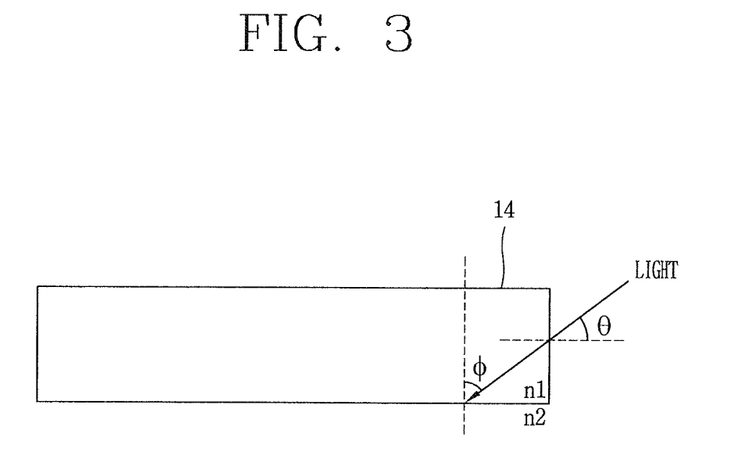
FIG. 3 is a view illustrating the total reflection of light at a light guide plate of the transparent display device according to a first embodiment of the present invention.

As illustrated in FIG. 3, in case where light entered through a lateral surface of the light guide plate 14 is entered at an angle of φ to the interface between the light guide plate 14 and the air, the exit angle should be greater than 90 degrees to totally reflect all light at the interface between the light guide plate 14 and the air. In other words, the relation of n2 sin φ≥n1 sin 90° should be satisfied. Here, n1 is 1 and n2 is about 1.49, and thus $\phi \geq \sin^{-1}(1/1.49)=42.16°$. In other words, in case where light is entered into the interface between the light guide plate 14 and the air at an angle greater than 42.16°, all air is totally reflected and supplied to the liquid crystal display panel 16.

As a result, light entered to the interface between the light guide plate 14 and the air at an incident angle greater than 42.16° is all reflected and supplied to the liquid crystal display panel 16, but light entered at an incident angle less than 42.16° is not reflected into the light guide plate 14 at the interface between the light guide plate 14 and the air but refracted to be exited to a lower portion of the light guide plate 14. In this manner, in case where light is existed to a lower portion of the light guide plate 14, the efficiency of light supplied to the liquid crystal display panel 16 is decreased, thereby reducing luminance in the image mode of a transparent liquid crystal display device.

Figure 4:
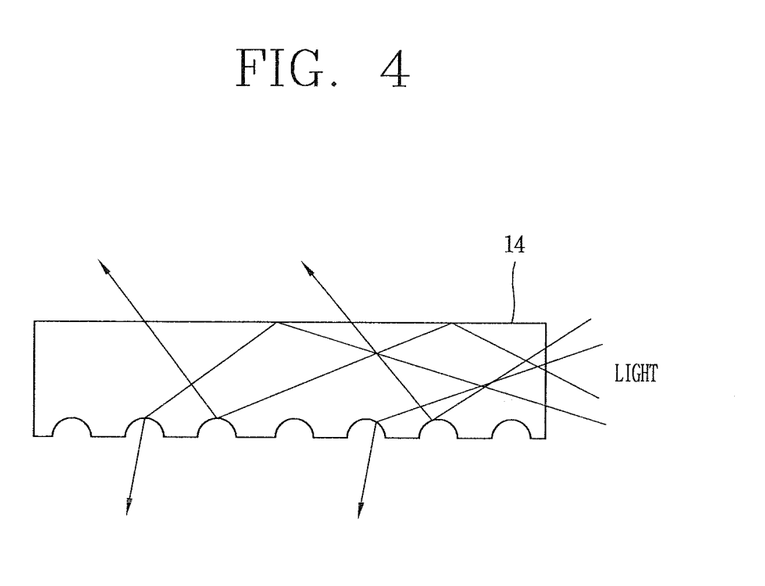
FIG. 4 is a view illustrating the total reflection of light in a light guide plate in which a pattern is formed at a lower surface thereof in a transparent display device according to a first embodiment of the present invention.

A pattern 15 formed at a lower portion of the light guide plate 14 minimizes the amount of light to be existed to the outside of the light guide plate 14 at the interface between the light guide plate 14 and the air as described above. In other words, as illustrated in FIG. 4, the incident angle of light entered to the interface between the light guide plate 14 and the air is changed by the pattern 15 to increase the ratio of light totally reflected at the interface between the light guide plate 14 and the air, thereby enhancing the luminance of light supplied to the liquid crystal display panel 16.

Figure 5:
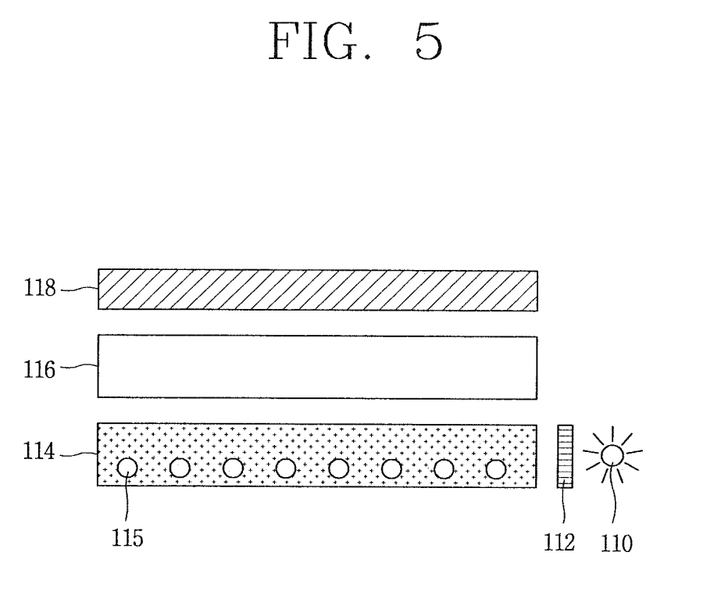
FIG. 5 is a view illustrating a transparent display device according to a second embodiment of the present invention.

FIG. 5 is a view illustrating the structure of a transparent display device according to a second embodiment of the present invention.

As illustrated in FIG. 5, a transparent liquid crystal display device according to this embodiment may include a liquid crystal display panel 116, a light guide plate 114 disposed at a lower portion of the liquid crystal display panel 116 to guide light to the liquid crystal display panel 116, a light source 110 disposed at a lateral surface of the light guide plate 114 to emit light to the light guide plate 114, a first polarizing plate 112 disposed between the light source 110 and a lateral surface of the light guide plate 114 to polarize the light emitted from the light source to enter into the light guide plate 114, and a second polarizing plate 118 disposed at an upper portion of the liquid crystal display panel 116 to polarize light transmitting through the liquid crystal display panel 116.

The light guide plate 114 is composed of a transparent material having a high optical transmissivity such acryl, epoxy, polymethyl methacrylate, and the like to guide incident light to the liquid crystal display panel 116. At this time, an air layer 115 is formed inside the light guide plate 114. The air layer 115 is formed by forming a predetermined shaped cavity inside the light guide plate 114. In this sense, the air layer 115 may be called a pattern that is formed inside the light guide plate 114. In other words, the air layer 115 is provided to totally reflect the light entered into the light guide plate 114, and it may include various meanings such as an air layer 115, a pattern, a cavity, or the like.

Figure 6:
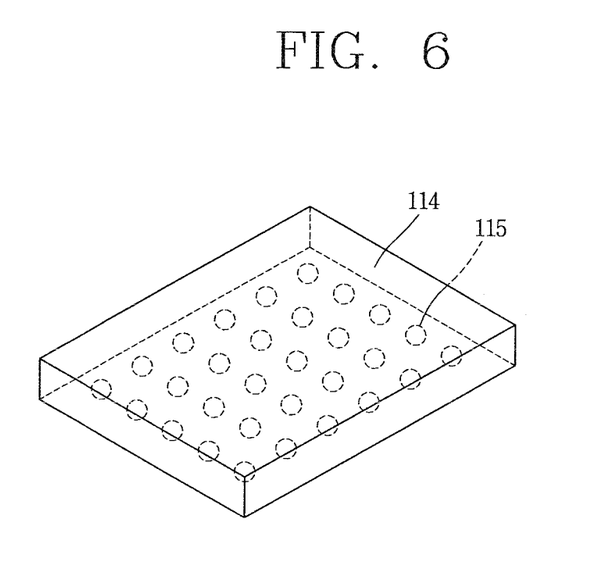
FIG. 6 is a perspective view illustrating the structure of a light guide plate of the transparent display device according to a second embodiment of the present invention.

As illustrated in FIG. 6, the air layer 115 is formed over an entire region of the light guide plate 114. At this time, the air layer 115 may be formed over an entire region of the light guide plate 114 in a regular manner, but may be formed in an irregular manner.

The light guide plate 114 transmits natural light entered from the rear surface therethrough as it is to supply to the liquid crystal display panel 116 thereby displaying an object at the rear surface, and totally reflects polarized light entered from the lateral surface to supply to the liquid crystal display panel 116*n*\, thereby implementing an image in the image mode.

The light entered through a lateral surface of the light guide plate 114 is totally reflected and supplied to the liquid crystal display panel 116. In other words, light entered from the interface between a lower surface of the light guide plate 14 and the external air is totally reflected and supplied to the liquid crystal display panel 116.

When light is totally reflected at the light guide plate 114, the air layer 115 enhances the total reflection efficiency of light. There exists a structural difference between the light guide plate 114 in this embodiment and the light guide plate 14 disclosed in the first embodiment. In the first embodiment, a pattern 15 such as a semicircle is formed at a lower portion of the light guide plate 14 and thus light entered to a lateral surface of the light guide plate 14 is totally reflected by the pattern 15, whereas in this embodiment, an air layer 115 such as a circle is formed inside the light guide plate 114 and thus light entered to a lateral surface of the light guide plate 114 is totally reflected at the interface with the air layer 115 and outputted through an upper surface of the light guide plate 114.

As illustrated in FIG. 4, in the light guide plate 14 of the first embodiment, most of light is totally reflected by the pattern 15 formed at a lower portion of the light guide plate 14, but all light is not totally reflected. Some of light may not be totally reflected by the pattern 15 but refracted to be exited to a lower portion of the light guide plate 14.

However, according to this embodiment, an air layer 115 is formed inside the light guide plate 114 and thus light is totally reflected to an upper portion of the light guide plate 114 by the air layer 115 to be supplied to the liquid crystal display panel 116. It will be described as follows.

Figure 7:
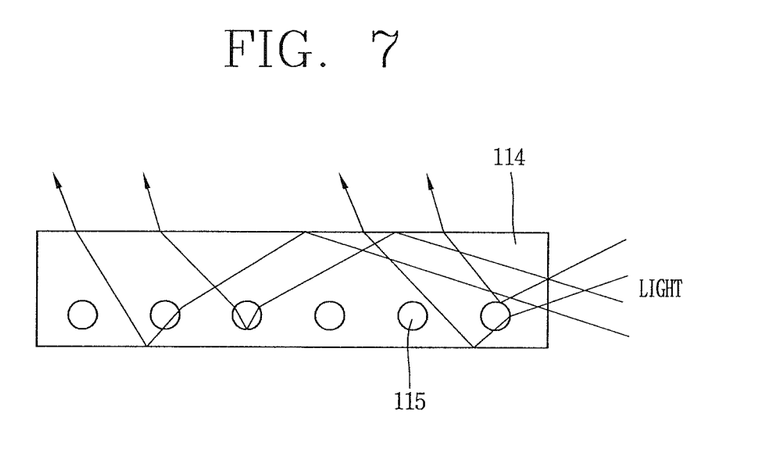
FIG. 7 is a view illustrating the total reflection of light in a light guide plate of the transparent display device according to a second embodiment of the present invention.

As illustrated in FIG. 7, if light entered from a lateral surface of the light guide plate 114 reaches the air layer 115, then the light is refracted or totally reflected by a difference between the refractive indices of the air and light guide plate 114. At this time, light that has not been totally reflected but refracted is propagated into the air layer 115, and then reaches the interface with the air layer 115 again, and thus it is totally reflected or refracted once again by a difference between the refractive indices of the air and light guide plate 114. In other words, the total reflection and refraction is repeated twice by the air layer 115, and thus light that has not been totally reflected at a first interface is totally reflected at a second interface of the air layer 115 and supplied to the liquid crystal display panel 116 through an upper surface of the light guide plate 114.

Furthermore, light that has not been totally reflected even at the second interface is refracted to be entered into a lower surface of the light guide plate 114, and the incident light is totally reflected again. In other words, light that has been refracted twice by the air layer 115 and reached to a lower surface of the light guide plate 114 is totally reflected into the light guide plate 114 again at the interface of the light guide plate 114 by a difference between the refractive indices of the light guide plate 114 and the external air.

In this manner, according to the present invention, the air layer 115 is formed inside the light guide plate 114, and thus light entered to the light guide plate 114 is totally reflected several times, thereby allowing most of light to be totally reflected to the liquid crystal display panel 116.

The light guide plate 114 in which the air layer 115 is formed thereinside as described above may be formed by various methods, and it will be described in more detail as follows.

The light guide plate 114 according to a second embodiment of the present invention may be formed by a molding processing method. In other words, a molding having a shape in which the air layer 115 is to be formed thereinside is manufactured, and a transparent material having a high optical transmissivity such acryl, epoxy, polymethyl methacrylate, and the like is injected by the manufactured molding to form the air layer 115.

In addition, the light guide plate 114 according to a second embodiment of the present invention may be processed by laser to form the air layer 115.

Figure 8:
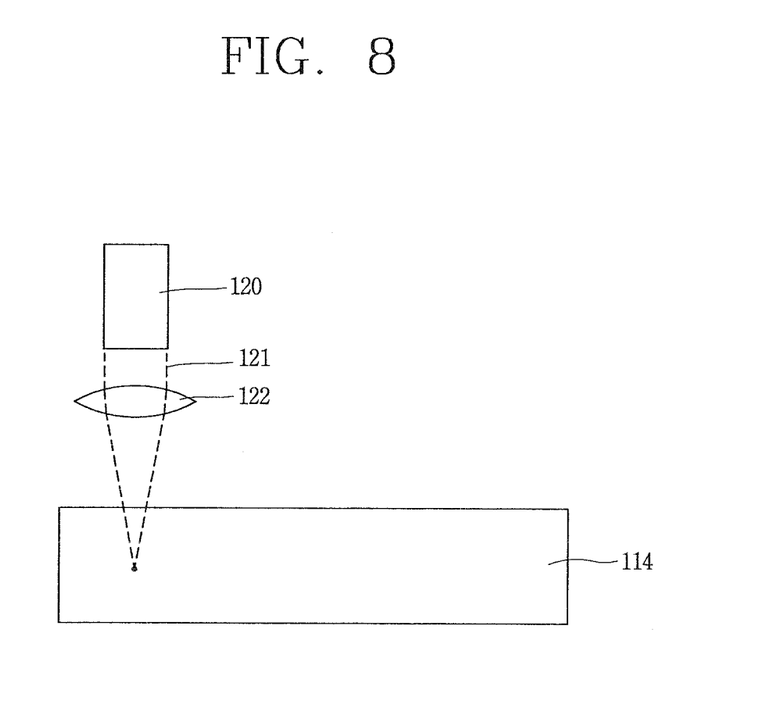
FIG. 8 is a view illustrating a process of forming an air layer in a light guide plate of the transparent display device according to a second embodiment of the present invention.

In other words, as illustrated in FIG. 8, the light guide plate 114 is produced, and then a laser 120 is disposed at an upper portion of the light guide plate 114 to irradiate a laser beam 121 to the light guide plate 114 and melt the inside of the light guide plate 114, thereby forming the air layer 115 inside the light guide plate 114. At this time, $CO_2$ laser or yttrium aluminum garnet (YAG) laser may be used for the laser 120.

As illustrated in FIG. 8, a condensing lens 122 is disposed at a front surface of the laser 120 to condense a laser beam 121 oscillated by the laser 120, thereby melting the light guide plate 114. In other words, if a spot of the laser beam 121 with high energy is formed at a position where the air layer 115 is to be formed, i.e., inside the light guide plate 114, by the condensing lens 122, then light absorption, which is not generated at low energy by nonlinear absorption phenomenon, is generated inside the light guide plate 114 to create micro melting or micro crack, and thus the air layer 115 is formed in a region where a light guide material is removed by the melting.

Figure 9A:
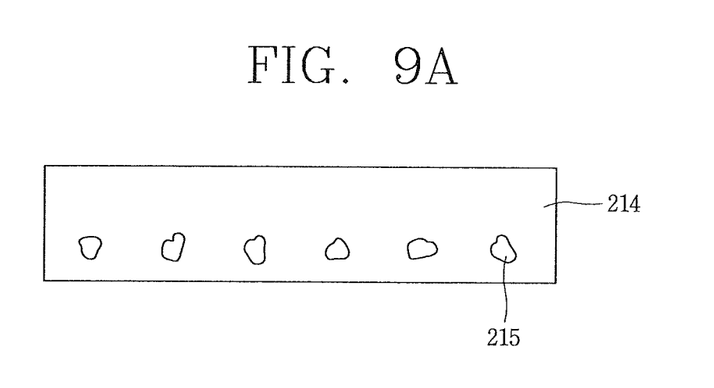
FIGS. 9a through 9c are perspective views illustrating the structure of a light guide plate of a transparent display device according to a third embodiment of the present invention.
Figure 9B:
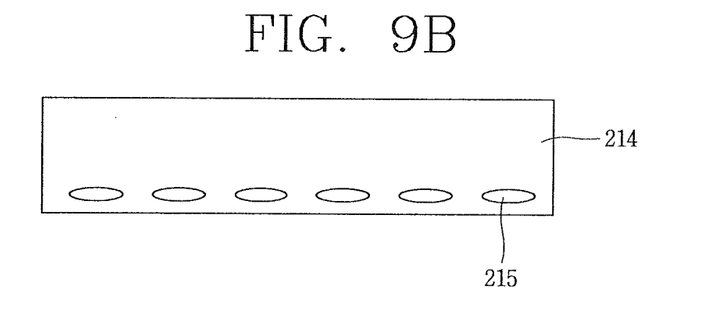
Figure 9C:
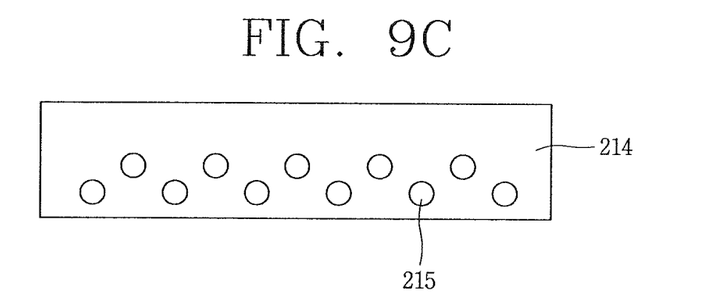

FIGS. 9a through 9c are views illustrating a light guide plate 214 of a transparent display device according to a third embodiment of the present invention.

First, as illustrated in FIG. 9a, an air layer 215 in the light guide plate 214 of a transparent display device in this embodiment is formed in a rugged shape whereas the air layer 115 in the embodiment illustrated in FIG. 5 is a circular shape. In addition, the air layer 115 in the embodiment illustrated in FIG. 9b is formed in an oval shape.

In other words, according to the present invention, the shape of an air layer 215 formed in the light guide plate 214 can be made in any shape. The air layer 215 totally reflects the light entered into the light guide plate 214 to supply light having high luminance to the liquid crystal display panel, and therefore, any shape of the air layer 215 may be used if it is possible to effectively reflect light in this manner.

In FIGS. 9a and 9b, only a rugged circular or oval shaped air layer 215 is disclosed, but the air layer 215 may be formed in various shapes such as a polygonal shape, a star shape, or the like.

As illustrated in FIG. 9c, the air layer 215 may be formed with a plural layers in the light guide plate 214 of the present invention. In other words, the air layer 215 may be distributed over an entire region of the light guide plate 214 with at least two layers in this embodiment, whereas the air layer 115 is uniformly formed over an entire region of the light guide plate 114 with one layer in the embodiment illustrated in FIGS. 5 and 6.

In this manner, the air layer 215 may be distributed in the light guide plate 214 with at least two layers, and thus light that has not been totally reflected on the air layer 215 at the upper portion thereof but refracted is totally reflected again and supplied to the liquid crystal display panel, thereby enhancing the luminance of light supplied to the liquid crystal display panel.

As described above, according to the present invention, a plurality of air layers are formed in a light guide plate disposed at a lower portion of the liquid crystal display panel in a transparent display device to enhance the total reflection efficiency of light entered into the light guide plate, thereby enhancing the luminance of light supplied to the liquid crystal display panel.

Moreover, a transparent display device of the present invention is not merely limited to a transparent display device with a specific structure. For example, though it has been disclosed a transparent display device having a structure in which a transparent light guide plate is provided and a first polarizing plate is disposed at a lateral surface of the light guide plate to allow the first polarized light to be entered into the liquid crystal display panel through the light guide plate in the detailed description, the present invention is not limited to only the transparent display device with such a structure, but may be applicable to all kinds of transparent display devices. In particular, it may be applicable to all kinds of transparent display devices in which an air layer is formed inside the light guide plate disposed at a lower portion of the liquid crystal display panel.

In other words, other examples or embodiments of a liquid crystal display device using the basic concept of the present invention can be easily contrived by those skilled in the art.

What is claimed is:

1. A transparent display device, comprising:
a liquid crystal display panel;
a light source disposed at one side of a lower portion of the liquid crystal display panel to emit light;
a first polarizing plate for polarizing the light emitted from the light source;
a light guide plate having a front surface facing the liquid crystal display panel, and a rear surface opposing to the front surface, and a lateral surface between the front surface and the rear surface, the light guide plate being disposed at a lower portion of the liquid crystal display panel to reflect totally the light polarized in an axis-direction by the first polarizing plate to the lateral surface of the light guide plate and supply to the liquid crystal display panel, and transmit natural light entered from a lower direction therethrough;
a plurality of air layers formed inside the light guide plate to reflect totally the incident light; and
a second polarizing plate at an upper portion of the liquid crystal display panel to control the amount of polarized light transmitting the liquid crystal display panel,
wherein the natural light is incident to the rear surface of the light guide plate from the outer portion of the display device and then supplied directly to the liquid crystal display panel through front surface of the light guide plate without a polarizing state of the light to transmit the liquid crystal display panel in order to display transparently an object at the rear portion of the liquid crystal display panel when a signal is not applied to the liquid crystal panel, and the light polarized by the first polarizing plate is supplied through the lateral surface of the light guide plate to the liquid crystal display panel to display an image according to the inputted signal when the signal is not applied to the liquid crystal panel.

2. The transparent display device of claim 1, wherein the light source comprises a cathode ray fluorescent lamp or external electrode fluorescent lamp.

3. The transparent display device of claim 1, wherein the light source comprises a light-emitting device (LED).

4. The transparent display device of claim 1, wherein the optical axes of the first polarizing plate and second polarizing plate are perpendicular to each other.

5. The transparent display device of claim 1, wherein the air layer is formed in a circular shape.

6. The transparent display device of claim 1, wherein the air layer is formed in an oval shape.

7. The transparent display device of claim 1, wherein the air layer is formed with at least one layer over an entire region of the light guide plate.

8. A liquid crystal display panel;
a light source disposed at one side of a lower portion of the liquid crystal display panel to emit light;
a first polarizing plate for polarizing the light emitted from the light source;
a light guide plate having a front surface facing the liquid crystal display panel, and a rear surface opposing to the front surface, and a lateral surface between the front surface and the rear surface, the light guide plate being disposed at a lower portion of the liquid crystal display panel to reflect totally the light polarized in an axis-direction by the first polarizing plate to the lateral surface of the light guide plate to supply the light into the liquid crystal display panel, and transmit natural light entered from a lower direction therethrough;
a total light reflection member formed inside the light guide plate to totally reflect incident light; and
a second polarizing plate disposed at an upper portion of the liquid crystal display panel to control the amount of polarized light transmitting the liquid crystal display panel,
wherein the natural light is incident to the rear surface of the light guide plate from the outer portion of the display device and then supplied directly to the liquid crystal display panel through front surface of the light guide plate without a polarizing state of the light to transmit the liquid crystal display panel in order to display transparently an object at the rear portion of the liquid crystal display panel when a signal is not applied to the liquid crystal panel, and the light polarized by the first polarizing plate is supplied through the lateral surface of the light guide plate to the liquid crystal display panel to display an image according to the inputted signal when the signal is not applied to the liquid crystal panel.

9. The transparent display device of claim 8, wherein the total reflection member is an air layer formed inside the light guide plate.

10. The transparent display device of claim 8, wherein the total reflection member is a pattern formed inside the light guide plate.

11. The transparent display device of claim 8, wherein the total reflection member is a cavity formed inside the light guide plate.

* * * * *